United States Patent
Kato

(10) Patent No.: US 7,537,354 B2
(45) Date of Patent: May 26, 2009

(54) THREE DIMENSIONAL IMAGE ILLUMINATION FOR INSTRUMENT GAUGE

(75) Inventor: Takahira Kato, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 25 days.

(21) Appl. No.: 11/644,023

(22) Filed: Dec. 21, 2006

(65) Prior Publication Data

US 2008/0151525 A1 Jun. 26, 2008

(51) Int. Cl.
*G01D 11/28* (2006.01)
*G01D 11/24* (2006.01)

(52) U.S. Cl. ............................ 362/23; 362/29; 362/488; 362/489; 116/62.1; 116/305

(58) Field of Classification Search ........................ None
See application file for complete search history.

(56) References Cited

U.S. PATENT DOCUMENTS

| | | | |
|---|---|---|---|
| 6,333,697 B1 * | 12/2001 | Kumazawa et al. | 340/815.4 |
| 6,674,578 B2 * | 1/2004 | Sugiyama et al. | 359/631 |
| D487,417 S * | 3/2004 | Hsu | D12/192 |
| 6,802,276 B2 * | 10/2004 | Sugimoto | 116/62.1 |
| 7,242,381 B2 * | 7/2007 | Kato et al. | 345/89 |
| 7,275,497 B2 * | 10/2007 | Kato | 116/304 |
| 2003/0043108 A1 * | 3/2003 | Iwase et al. | 345/107 |
| 2004/0213088 A1 * | 10/2004 | Fuwausa | 368/228 |
| 2005/0074681 A1 * | 4/2005 | Iwase et al. | 430/9 |
| 2006/0012971 A1 * | 1/2006 | Fong et al. | 362/23 |
| 2007/0284169 A1 * | 12/2007 | Zabiega | 180/90 |

* cited by examiner

*Primary Examiner*—Sandra L O'Shea
*Assistant Examiner*—Danielle Allen
(74) *Attorney, Agent, or Firm*—Harness, Dickey & Pierce, PLC

(57) ABSTRACT

In one configuration, a gauge of an instrument cluster may have a base structure with an integrally molded dial structure and a separate, attached dial structure. A transparent area of the base structure may pass light from one side of the base structure to another side. This provides the ability to supply backlighting and floodlighting to the gage structure with just a single LED. The separate dial structure may be translucent to provide floodlighting or to supply light to graduations. Relative to a gauge pointer, inboard indicia in one dial structure denote vehicle speeds, while outboard graduations in another dial structure demark the indicia. The transparent portion of the base structure may be an integrally molded horizontal, angular or vertical portion within the base structure. Multiple levels and angles of the gauge provide a viewed component that is aesthetically pleasing and soothing to a viewer's eyes.

13 Claims, 3 Drawing Sheets

THREE DIMENSIONAL IMAGE ILLUMINATION FOR INSTRUMENT GAUGE

FIELD

The present invention relates to instrument panel gauges in vehicles and more particularly to an instrument panel gauge presenting a three-dimensional viewing arrangement.

BACKGROUND

The statements in this section merely provide background information related to the present disclosure and may not constitute prior art.

Instrument clusters on automobiles generally include a plurality of gauges for displaying operational information such as vehicle speed, engine RPM, engine temperature, fuel level and other information related to driving or vehicle conditions. The gauges may include analog or digital readings for displaying the information depending on manufacturer and styling preferences. An analog gauge typically includes a faceplate having indicia thereon such as numbers and a pointer for rotating to the appropriate number.

One design consideration for an instrument cluster and related gauges is the ability of a vehicle operator to easily view and read the gauges in all driving environments. In particular, nighttime driving requires the instrument cluster to illuminate in some fashion such that the numbers and indicia are quickly and easily discernible.

SUMMARY

In one configuration, a gauge of an instrument cluster may have a base structure with an integrally molded dial structure with a transparent portion. Mounted to the base structure is a separate, translucent dial structure through which a first light source emits light that passes from a first side of the base structure through the transparent portion. Relative to a gauge pointer, inboard indicia in one dial structure denote vehicle speeds, while outboard graduations in another dial structure demark the indicia. The transparent portion of the base structure may be an integrally molded horizontal, angular or vertical portion within the base structure.

In another configuration, a gauge of an instrument cluster has a base structure, a first dial structure with indicia mounted as a separate piece on the base structure, and a second dial structure with graduations that demark the first indicia. Additionally, the second dial structure may be integrally formed as part of the base structure, outboard of the first dial structure. A transparent portion may be an integral portion of the base structure, in which case it may be located under the first dial structure to pass light from a light source. The first dial structure, which includes the first indicia, may be angled relative to the base structure and transmit light onto the second dial structure. The second dial structure may also be angled relative to other portions of the base structure. A light source under the first dial structure and a transparent portion of the base structure under the first dial structure may transmit light into the first dial structure, which may be translucent or transparent.

In yet another configuration, a gauge of an instrument cluster may have a base structure with an integrally molded first dial structure, a first light source, and a transparent portion in the base structure that passes light from the first light source to a second dial structure. Translucent indicia in the first dial structure are illuminated from the first light source. The second dial structure may be a separate, translucent, detachable piece from the base structure and have graduations that demark indicia on the first dial structure. The second dial structure is outboard of the first dial structure, with respect to a pointer located at their center. Graduations in the second dial structure demark indicia on the first dial structure, while a second light source may pass light through the translucent second dial structure to the graduations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
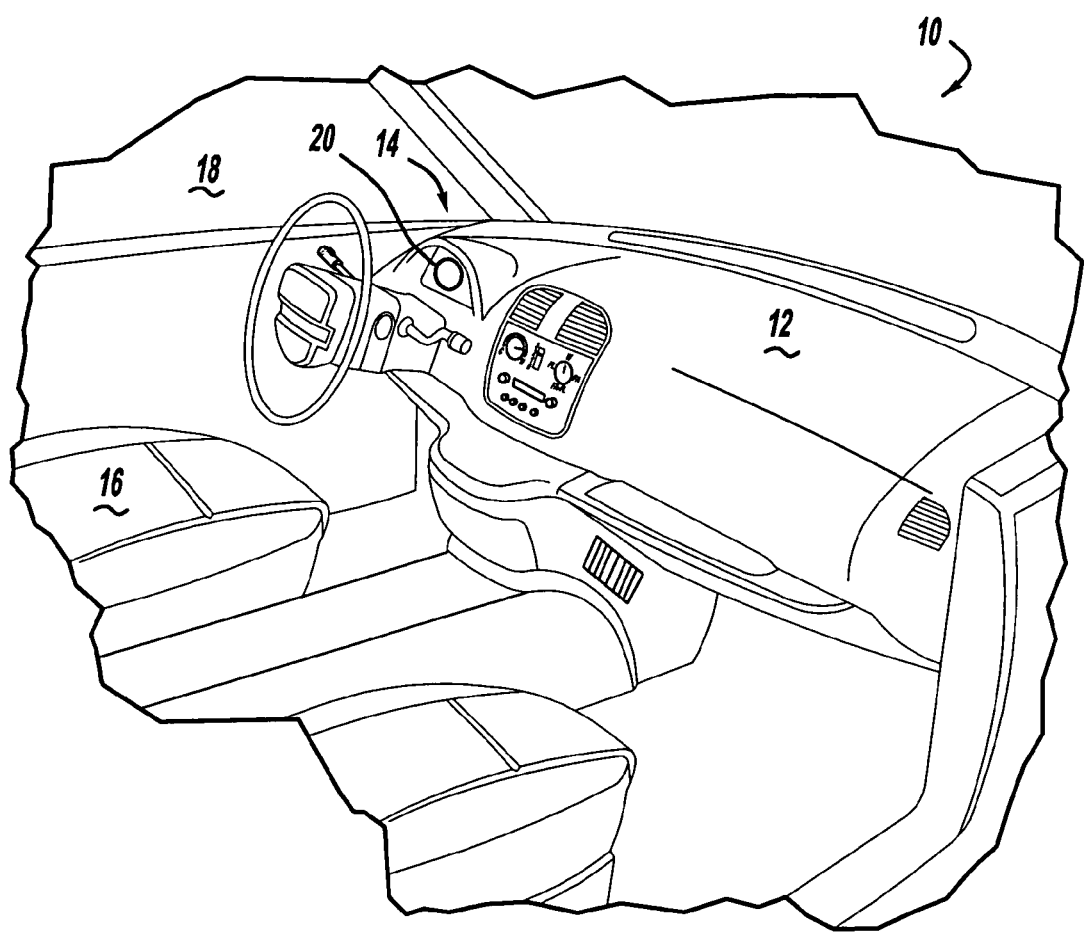
FIG. 1 is a perspective view of an interior dash of a vehicle depicting a location of a gauge.

The following description is merely exemplary in nature and is not intended to limit the present disclosure, application, or uses. It should be understood that throughout the drawings, corresponding reference numerals indicate like or corresponding parts and features.

With initial reference to FIG. 1, depicted is a vehicle 10 having a dash 12 and an instrument cluster 14, both of which may be situated in front of a driver's seat 16 in the interior cabin 18 of the vehicle 10. As part of the instrument cluster 14, a viewed component 20 is depicted. Hereinafter, the viewed component is exemplified by a gauge, such as a speedometer. It is appreciated that the viewed component 20 may be exemplified by other gauges, dials or instruments such as, but not limited to, tachometers, fuel gauges, temperature gauges, oil pressure gauges, etc.

Figure 2:
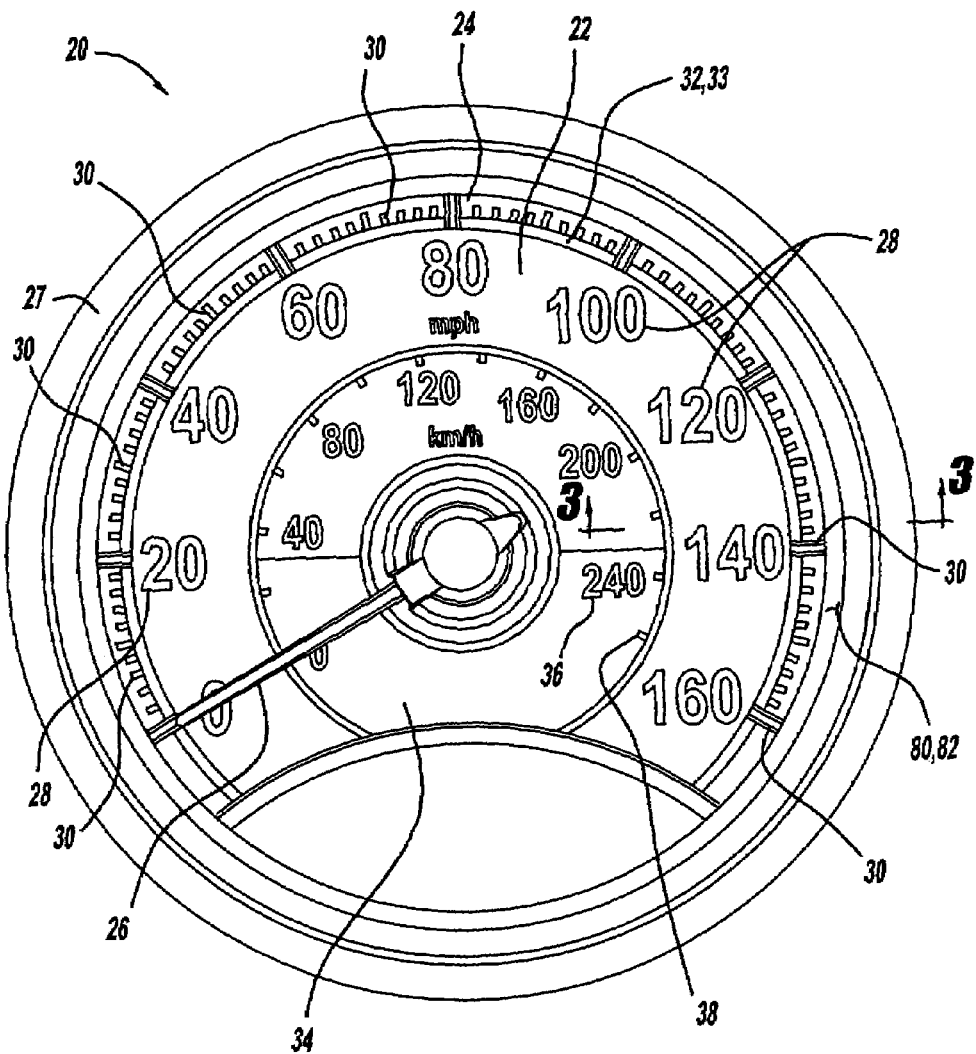
FIG. 2 is a front view of a gauge constructed in accordance with the present invention.

Turning now to FIG. 2, the speedometer 20 generally includes a first dial 22, a second dial 24, a pointer 26, and an outer casing 27 or housing. The first dial 22 denotes miles per hour (mph) to a driver using indicia 28 and the pointer 26. The second dial 24 denotes graduations 30 that demark the indicia 28 of the first dial 22. The first dial 22 and second dial 24 may be displayed on different viewing levels, or at least different angles, relative to a common base structure. The dials 22, 24 are separated by an outboard surface 32, which may lie at an edge of the first dial 22. Continuing with FIG. 2, an inner dial 34 utilizes inner dial graduations 38 to demark indicia 36 of a scale representing kilometers per hour (km/h). Because the inner dial 34 is an auxiliary or secondary scale, it is located immediately adjacent to the pointer 26 and has indicia 36 that are smaller in size than the indicia 28 of the first dial 22. As depicted in FIG. 2, the speedometer 20 is a typical US configuration insofar as the first dial 22 has mph indicia 28 larger than the corresponding Km/h indicia 36, which apply to countries using metric measurements, such as Canada.

Figure 3A:
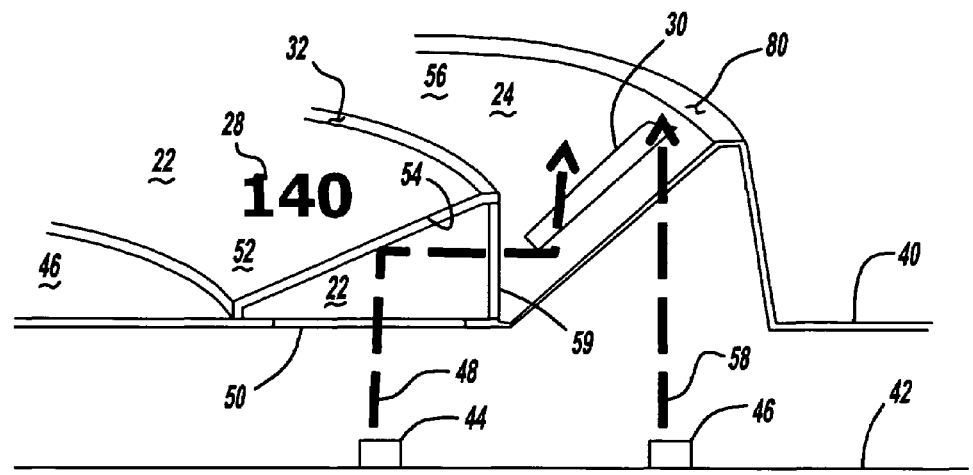
FIG. 3a is a cross-sectional view of a first embodiment of the gauge component of FIG. 2.

As will now be described in greater detail with reference to FIGS. 2, 3a and 3b, the speedometer 20 provides a layered viewing surface offering an observer an easy to view and read instrument. FIG. 2 will continue to be referenced while the embodiment of FIG. 3a is presented first. FIG. 3a depicts an embodiment of the invention in cross-section in which a forming dial 40 or base structure, which may be molded from an acrylic material, provides a base structure from which the first and second dials 22, 24 are based. Before moving into details of the dials 22, 24 themselves, dial lighting will be presented. A printed circuit board ("PCB") 42 behind the forming dial 40, with reference to a viewer's perspective, may have a light source, such as light emitting diodes ("LEDs") 44, 46 mounted to the PCB. The LEDs 44, 46 provide light to the first and second dials 22, 24 such that a viewer, such as a vehicle driver, may comfortably and easily view the indicia 28 and corresponding graduations 30. Additionally, the viewer may also view indicia 36 and corresponding graduations 38 in an inner area 46 of the forming dial 40 with the LED 44, 46 lighting.

Continuing with FIGS. 2 and 3a, in order for a nighttime viewer to see the indicia 28, such as mph marking "140," of the first dial 22, the LED 44 emits a beam of light 48 through the forming dial 40 at location 50. Location 50 represents a clear or transparent portion 50 around the forming dial 40 upon which the first dial 22 is mounted. The first dial 22 may be a separate piece apart from the forming dial 40 and attach using adhesives, mechanical fasteners or the like. Continuing, the first dial 22 is a circular, wedge-shaped piece that provides angularity to the indicia 28. More specifically, the first dial 22 is, in one example, a transparent or translucent ring that is painted or printed on its angular, top surface 52 so that light does not pass, except through the indicia 28, which are translucent. Such indicia 28 may be made in a multitude of colors. In such a manner, the nighttime viewer is able to clearly see the indicia 28 upon the darkened, or otherwise contrasting surface 52, through which light does not pass, or through which light may be restricted.

Continuing with the top surface 52 of FIG. 3a, although light does not pass through the top surface 52, light may reflect from the interior surface 54 of the first dial 22 when the LED 44 projects light 48 through the area 50. The light beam 48 projecting from the interior surface 54 is directed as floodlighting toward the second dial 24, which contains the graduations 30 for the indicia 28 of the first dial 22. To successfully reflect part of the light beam 48 to the surface 56 as floodlighting, the rear wall 59 of the first dial 22 may be of the same translucent material as the first dial 22; that is, with no light-blocking coatings. The surface 56 of the second dial 24 may be coated or sheet molded in a fashion to prevent light rays 48, 58 from passing through the surface 56, with the exception of through graduations 30, regarding light ray 58. As depicted in FIG. 2, the graduations 30 are the identifying marks for the indicia 28. In addition to the beam of light 48, a second beam of light 58 may emit from LED 46 to provide back lighting for the graduations 30. To take advantage of such backlighting at the graduations 30, the forming dial 40 is translucent or otherwise constructed of a light-passing material to pass the light beam 58. The surface 32 provides visible, lighted separation between the first dial 22 and second dial 24. Additionally, the surface 80 of the forming dial, provides a lighted, visual outer boundary for the graduations 30.

Regarding the embodiment of FIG. 3a, multiple advantages are evident. First, the first dial 22 may be a separate piece, apart from the forming dial 40. With such a structure, the angle of the surface 52 of the first dial 22 can easily be changed by substituting a different piece. This substitution advantage provides the opportunity to place the gauge 20 into various applications with only a slight change. With a different first dial 22, the indicia 28 may be changed in addition to the part angle. Second the one-piece forming dial 40, which acts as a base from which the gauge 20 is constructed, provides rigid support for the first dial 22. Adding to this advantage, the second dial 24 is actually part of the forming dial 40 and thus, in this regard, there are no thin "bridges" or pieces of material that otherwise may be necessary to join a dual dial structure. A third advantage is that because the LED 44 provides a dual function of providing backlighting for the indicia 28 and providing floodlighting to illuminate the surface 56 of the second dial 24, the light emitted from the LED 44 is used very efficiently in a dual role. A fourth advantage is that during nighttime viewing of the illuminated gauge 20, the multi-level, multi-angle structure of the gauge 20 is easier and more relaxing to view because the three-dimensional effect is enhanced. This makes the gauge 20 more aesthetically pleasing than other designs, such as a flat gauge 20, regardless of whether it is backlit or lit with floodlighting.

Figure 3B:
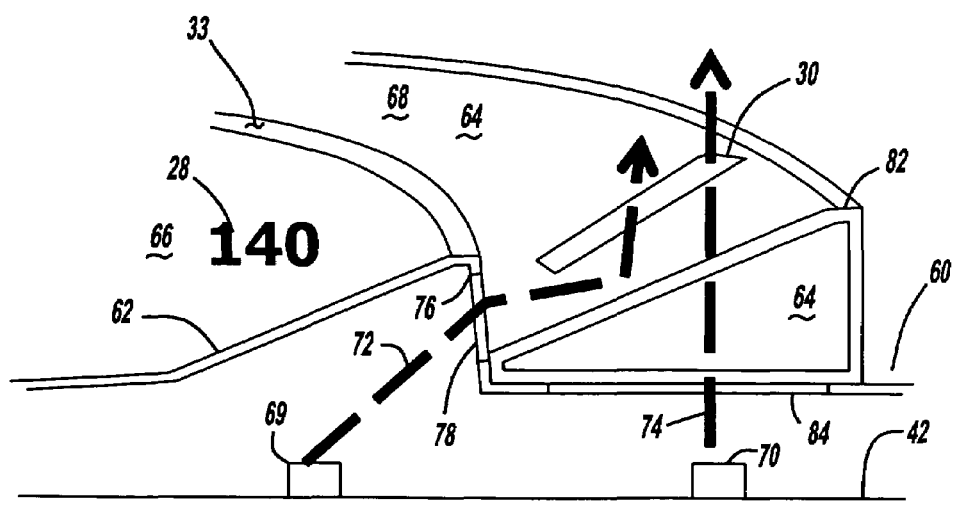
FIG. 3b is a cross-sectional view of a second embodiment of the gauge component of FIG. 2.

Turning now to the embodiment of FIG. 3b, a forming dial 60, which may be made from a molded acrylic, has a first dial 62 and a second dial 64. In this embodiment, the first dial 62 is formed as an integral part of the forming dial 60 in which the indicia 28, depicted as "140" in FIG. 3b, is a translucent area of the first dial 62. The balance of the first dial 62 immediately surrounding the indicia 28 does not transmit light. In such a fashion, light from a light beam 72, which originates from an LED 69 or similar light source, illuminates the translucent indicia 28 of the surface 66 of the first dial 62. Continuing, the forming dial 60 has the second dial 64, which is a separate structure, mounted to it. The second dial 64 may be a separate piece apart from the forming dial 60 and attach using adhesives, mechanical fasteners or the like. Continuing, the second dial 64 may be a circular, wedge-shaped piece that provides angularity and the appearance of depth to the graduations 30 formed into its surface 68, especially when viewed in conjunction with the indicia 28 of the first dial 62.

Lighting the first and second dials 62, 64 is accomplished by LEDs 69, 70. More specifically, the LEDs 69 and 70 emit light beams 72 and 74, respectively. It is light from light beam 72 that assists in illuminating the indicia 28. Additionally, light beam 72 passes through the wall 76 of the forming dial 60 via transparent structure 78, which is integrally molded into the forming dial 60. To pass light through the wall 76, which is nearly perpendicular to the forming dial 60, the LED 69 may be angled slightly toward such wall 72. Because the light beam 72 passes through the vertical wall 72, the light beam 72 provides floodlight illumination to the surface 68 of the second dial 64. The surface 68 of the second dial 64 may be painted, printed or molded in a particular color to take aesthetic advantage of the floodlighting 72 that illuminates the surface 68 after the light beam 72 passes through the wall 76.

The embodiment of FIG. 3b also has an LED 70 that emits a light beam 74 that passes through the forming dial 60 under the second dial 64 via a transparent region 84. The second dial 64 may be made of a molded translucent or transparent acrylic that permits light to pass into the second dial 64 and illuminate the second dial 64 to provide back lighting for the graduations 30 in the surface 68 of the second dial 64. Such graduations 30 may be made in a variety of translucent colors for aesthetic satisfaction. In such a fashion, the second dial 64 receives floodlighting for the surface 68 and backlighting for graduations 30. Similar to the embodiment of FIG. 3a, the forming dial 60 under the second dial 64 is provided with a clear or transparent area 84 so that light may pass into the second dial 64. To provide an enhanced visual effect, the first dial 62 defines a surface 33 that divides the first dial 62 and the second dial 64. Additionally, surface 82 of the second dial 64 provides a lighted, outboard boundary for the graduations 30 and gauge 20.

The embodiment of FIG. 3b has multiple advantages. First, the second dial 64 is a separate piece, apart from the forming dial 60. With such a structure, the angle of the surface 68 of the second dial 64 can easily be changed by substituting a piece with a different angle. This substitution advantage provides the opportunity to place the gauge into various applications with a slight change in effectively, only one part, the second dial 64. Second, the one-piece forming dial 60, which acts as a base from which the gauge 20 is constructed, provides rigid support for the second dial 64. Adding to this advantage, the first dial 62 is actually part of the forming dial 60 and thus, in this regard, there are no thin "bridges" or pieces of material that otherwise may be necessary to join a dual dial, such as a dual ring structure, which may require gaps between rings to pass light to subsequent rings. A third advantage is that because the LED 69 provides a dual function of providing backlighting for the indicia 28 and providing floodlighting for the second dial 64, the light emitted from the LED 69 is used very efficiently in such a dual role. A fourth advantage is that during nighttime viewing of the illuminated gauge 20, the multi-level structure of the gauge 20 is easier and more comfortable to view because the three-dimensional effect is enhanced. Finally, the angular, multi-level gauge of the present invention it is more aesthetically pleasing than other designs, such as a flat gauge 20, regardless of whether it is backlit or lit with floodlighting.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gauge of a vehicle instrument cluster, comprising:
a single piece base structure;
a first dial structure with first indicia, the first dial structure mounted as a separate piece on the base structure; and
a second dial structure with graduations that demark the first indicia, the second dial structure integrally formed as part of the single piece base structure outboard of the first dial structure, wherein the first dial structure is a triangularly shaped and physically detachable from the base structure;
the first dial structure further comprising:
a rear wall perpendicular to the base structure; and
a first dial surface upon which the first indicia reside, wherein the first dial structure, the single piece base structure, and the rear wall form a triangle.

2. The gauge of claim 1, further comprising:
a transparent portion of the base structure under the first dial structure, wherein light is passable through the transparent portion.

3. The gauge of claim 2, wherein the indicia and the first dial surface of the first dial structure are angled relative to the base structure.

4. The gauge of claim 3, wherein the first dial surface of the first dial structure transmits light onto the second dial structure.

5. The gauge of claim 4, wherein the second dial structure has a second dial surface that is angled relative to other portions of the base structure.

6. The gauge of claim 5, further comprising:
a light source under the first dial structure, wherein the light source provides light into the first dial structure perpendicular to the base structure and light exits the first dial structure perpendicular to the rear wall; and
a transparent portion of the base structure under the first dial surface that permits light transmission into the first dial structure.

7. A gauge of a vehicle instrument cluster, comprising:
a single piece base structure having an integrally molded first dial structure that is triangular in cross-section, and that protrudes away from the base structure, the base structure further comprising:
a first dial structure having a surface possessing translucent indicia, the surface angled relative to other portions of the base structure; and
a nearly perpendicular transparent portion to pass light from the first light source to a second dial structure; and
a first light source that directs light into the translucent indicia, the first light source on an opposite side of the base structure as the first dial structure.

8. The gauge of claim 7, wherein the second dial structure is triangular, is outboard of the first dial structure, and is a separate piece from the base structure, the second dial structure further comprising:
a first wall with a surface with graduations that demark the translucent indicia on the first dial structure, the first wall forming a hypotenuse of the triangular structure;
a second wall forming a second and shortest leg of the triangular structure; and
a third wall forming a third leg of the triangular structure, the third wall positioned against the base structure, the third wall positioning the indicia at a distance from the base structure.

9. The gauge of claim 8, further comprising:
a base structure transparent region; and
a second light source that passes light through the base structure transparent region of the second dial structure to and through the graduations.

10. A gauge of a vehicle instrument cluster, comprising:
a single piece base structure having an integrally molded first triangular dial structure and a transparent portion, the first triangular dial structure further comprising:
a first wall with a first transparent structure; and
a second wall that meets the first wall at an acute angle, the first wall possessing indicia arranged in a circular fashion;
a separate, triangular translucent dial structure that is mountable to the base structure, the triangular translucent dial structure further comprising:
a first wall perpendicular to the base structure;
a second wall contacting the first wall to form an acute angle, a farthest distance of the first wall from the base structure equal to a farthest distance of the second wall from the base structure; and
a third wall that abuts against the base structure and the transparent portion;
a first light source that passes light from a first side of the base structure, through the transparent portion of the base structure and into the triangular translucent dial structure.

11. The gauge of claim 10, further comprising:
indicia in the the first triangular dial structure; and
graduations in the triangular translucent dial structure corresponding to the indicia in the first triangular dial structure.

12. The gauge of claim 11, wherein the graduations are outboard of the indicia.

13. The gauge of claim 12, further comprising:
a second light source that directs light from the first side of the base structure, through the first transparent structure of the first wall, and onto the indicia in the triangular translucent dial structure.

* * * * *